US012676042B2

(12) United States Patent
Kim et al.

(10) Patent No.: US 12,676,042 B2
(45) Date of Patent: Jul. 7, 2026

(54) CASSETTE FOR AUTOMATED TELLER MACHINE

(71) Applicant: HYOSUNG TNS INC., Seoul (KR)

(72) Inventors: Seok Won Kim, Seoul (KR); Ji Hoon Woo, Seoul (KR); Dong Won Min, Seoul (KR); Tai Woo Lee, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/894,287

(22) Filed: Sep. 24, 2024

(65) Prior Publication Data

US 2025/0308310 A1 Oct. 2, 2025

(30) Foreign Application Priority Data

Apr. 2, 2024 (KR) ........................ 10-2024-0044817

(51) Int. Cl.

| | |
|---|---|
| ***B65H 1/02*** | (2006.01) |
| ***B65H 31/06*** | (2006.01) |
| ***G07D 11/125*** | (2019.01) |
| ***G07D 11/13*** | (2019.01) |

(52) U.S. Cl.

CPC ........... *G07D 11/125* (2019.01); *B65H 1/025* (2013.01); *B65H 31/06* (2013.01); *G07D 11/13* (2019.01); *B65H 2701/1912* (2013.01); *G07D 2211/00* (2013.01)

(58) Field of Classification Search

CPC .......... B65H 1/02; B65H 1/022; B65H 1/025; B65H 1/027; B65H 31/06; B65H 2701/19122; B65H 2301/42265; B65H 2301/42266; B65H 2301/42268; B65H 2701/1912; G07D 11/12; G07D 11/125; G07D 11/13

See application file for complete search history.

(56) References Cited

U.S. PATENT DOCUMENTS

| | | | | |
|---|---|---|---|---|
| 4,643,626 A * | 2/1987 | Noguchi | B65H 31/06 | 414/798.2 |
| 5,000,322 A * | 3/1991 | Goi | G07D 11/13 | 271/9.01 |
| 2003/0079626 A1* | 5/2003 | Yoshitani | G07B 17/00467 | 101/71 |
| 2003/0146569 A1* | 8/2003 | Monch | B65H 29/40 | 271/315 |
| 2005/0189708 A1* | 9/2005 | Nam | G07F 11/42 | 271/259 |
| 2007/0045396 A1* | 3/2007 | Kitagawa | B65H 31/06 | 235/379 |
| 2012/0141244 A1* | 6/2012 | Markgraf | B65H 1/025 | 414/798.9 |

FOREIGN PATENT DOCUMENTS

| | | | |
|---|---|---|---|
| EP | 0994445 A2 * | 4/2000 | G07F 19/00 |

* cited by examiner

*Primary Examiner* — Luis A Gonzalez

(74) *Attorney, Agent, or Firm* — BACON & THOMAS, PLLC

(57) ABSTRACT

A cassette for an automated teller machine includes: a case providing a support plate for supporting a medium; a front plate rotatably disposed in the case to guide the medium into an accommodation space within the case; and a push plate disposed on the support plate to be movable horizontally toward or away from the front plate. The support plate is disposed to be inclined downward within the accommodation space in a stack direction in which the medium is stacked.

6 Claims, 7 Drawing Sheets

"C"

CASSETTE FOR AUTOMATED TELLER MACHINE

TECHNICAL FIELD

The present disclosure relates to a cassette for an automated teller machine.

BACKGROUND

In general, an automated teller machine is a device installed in a place other than a financial institution's counter, allowing customers to conveniently use various financial services regardless of time and place, and can provide various financial services such as cash deposits and withdrawals, account transfers, balance inquiries, and passbook updates.

A cassette capable of storing mediums such as cash or checks may be provided inside an automated teller machine. The medium stored in the cassette may be taken out from the cassette upon a customer's withdrawal request, and new medium may be loaded into the cassette upon a customer's deposit request. The cassette may be arranged vertically or horizontally within the automated teller machine. When the cassette is arranged vertically within the automated teller machine, the medium is fed from the upper side of the cassette, so the medium can be stably stacked by its own weight in the space between a front plate and a push plate.

However, when the cassette is arranged horizontally inside the automated teller machine, there is a problem that the medium may be stacked in a crumpled or bulged state in the space between the front plate and the push plate.

SUMMARY

In view of the above, the present disclosure provides a cassette for an automated teller machine, which allows mediums to be stably stacked when being stacked horizontally.

In accordance with an embodiment of the present application, there is provided a cassette for an automated teller machine, including: a case providing a support plate for supporting a medium; a front plate rotatably disposed in the case to guide the medium into an accommodation space within the case; and a push plate disposed on the support plate to be movable horizontally toward or away from the front plate, wherein the support plate is disposed to be inclined downward within the accommodation space in a stack direction in which the medium is stacked.

The cassette may further includes a moving assembly for horizontally moving the push plate. The moving assembly may include: a main moving gear disposed on a side portion of the case to be engaged with a driving gear disposed in the automated teller machine when the cassette is mounted in the automated teller machine; a moving shaft drivingly connected to the main moving gear to receive driving force from the main moving gear; and a moving belt configured to receive driving force from the moving shaft and horizontally move the push plate.

The moving belt may have a support projection formed on an upper surface thereof to support the medium, and a gear projection formed on a bottom surface thereof to engage with a shaft gear of the moving shaft.

The support plate may be rotatably disposed in the case so that a downward tilting rotation angle is variable depending on a weight of the medium.

The cassette may further include an elastic member that provides elastic force to the support plate to restore the support plate to its original position when the support plate is rotated downwardly.

The push plate may include: a plate body part having a plate groove formed in a lower portion thereof; and a plate rib part disposed in the plate groove to be inserted in and protruded from the plate body part downwardly.

The plate rib part may be protruded from the plate body part when the push plate moves on the support plate in the stack direction while the support plate is rotated downward to block a gap space between a lower end of the plate body part and an upper surface of the support plate.

According to embodiments of the present disclosure, when mediums are stacked horizontally, the mediums are stacked with a downward slope within the stack space, thereby preventing the mediums from being stacked in a bulged or crumpled state, and ultimately enabling the mediums to be stably stacked within the cassette.

DETAILED DESCRIPTION

A preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, or 'supplied' to another element, it should be understood that the element may be directly connected to, or supplied to the other element, but that other elements may exist in the middle.

The terms used in the present disclosure are only used for describing specific embodiments, and are not intended to limit the present disclosure. Singular expressions include plural expressions unless the context clearly indicates otherwise.

Further, some components are exaggerated, omitted, or schematically illustrated in the accompanying drawings, and the size of each component does not fully reflect the actual size.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

Hereinafter, an automated teller machine according to one embodiment of the present disclosure will be specifically described.

Figure 1:
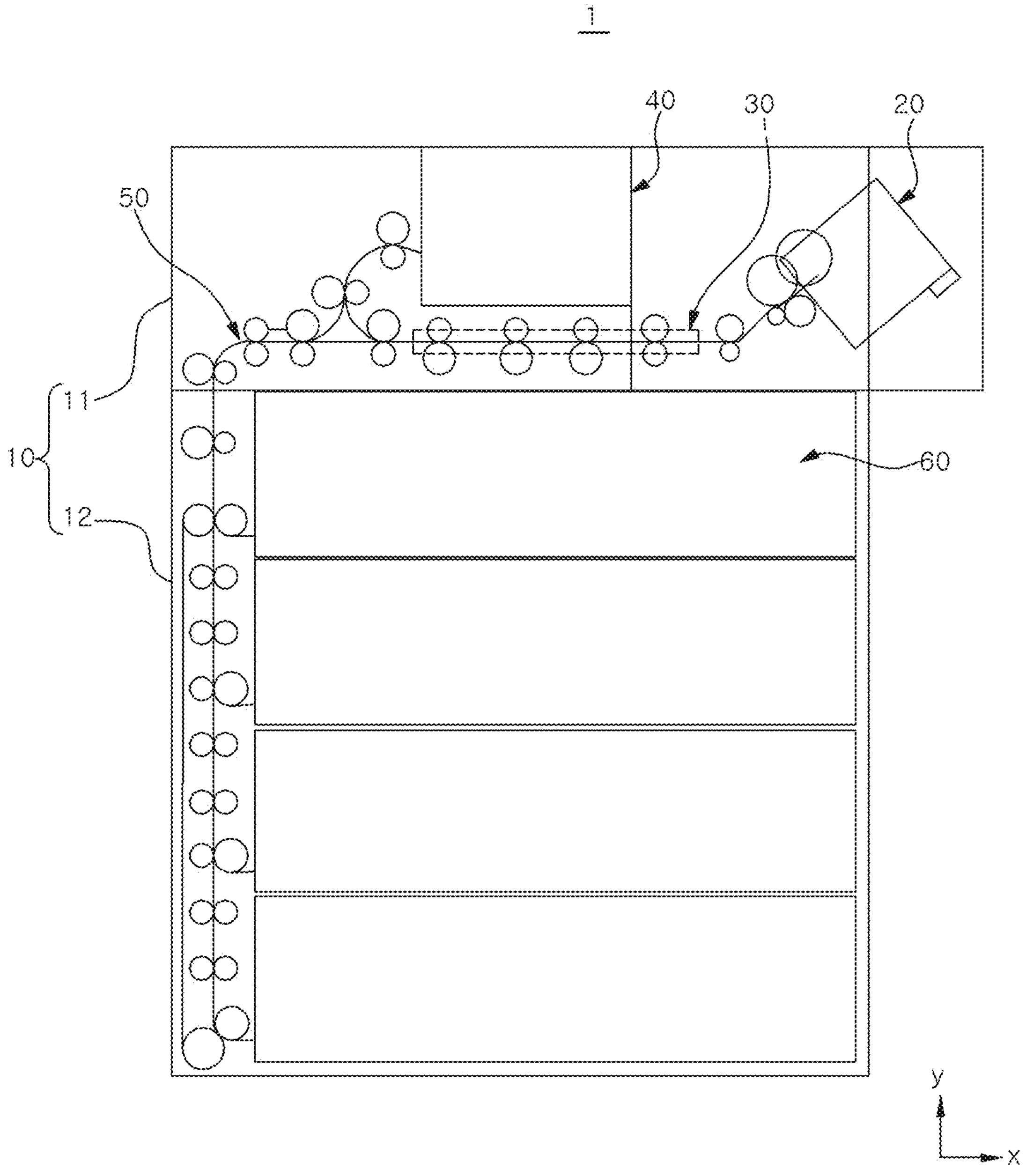
FIG. 1 is a schematic diagram showing an automated teller machine according to one embodiment of the present disclosure.
Figure 2:
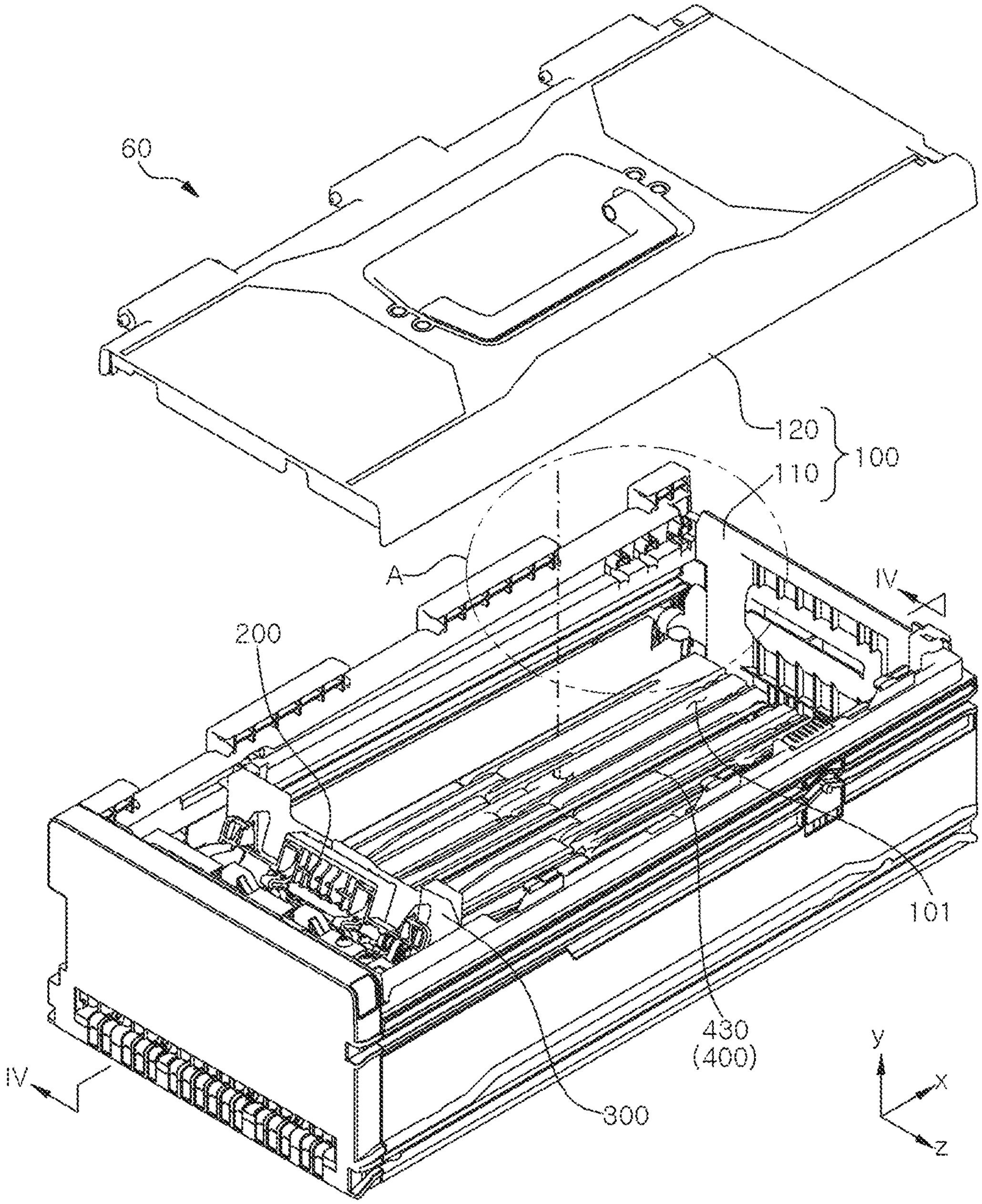
FIG. 2 is an exploded perspective view showing a cassette for the automated teller machine according to one embodiment of the present disclosure.
Figure 3:
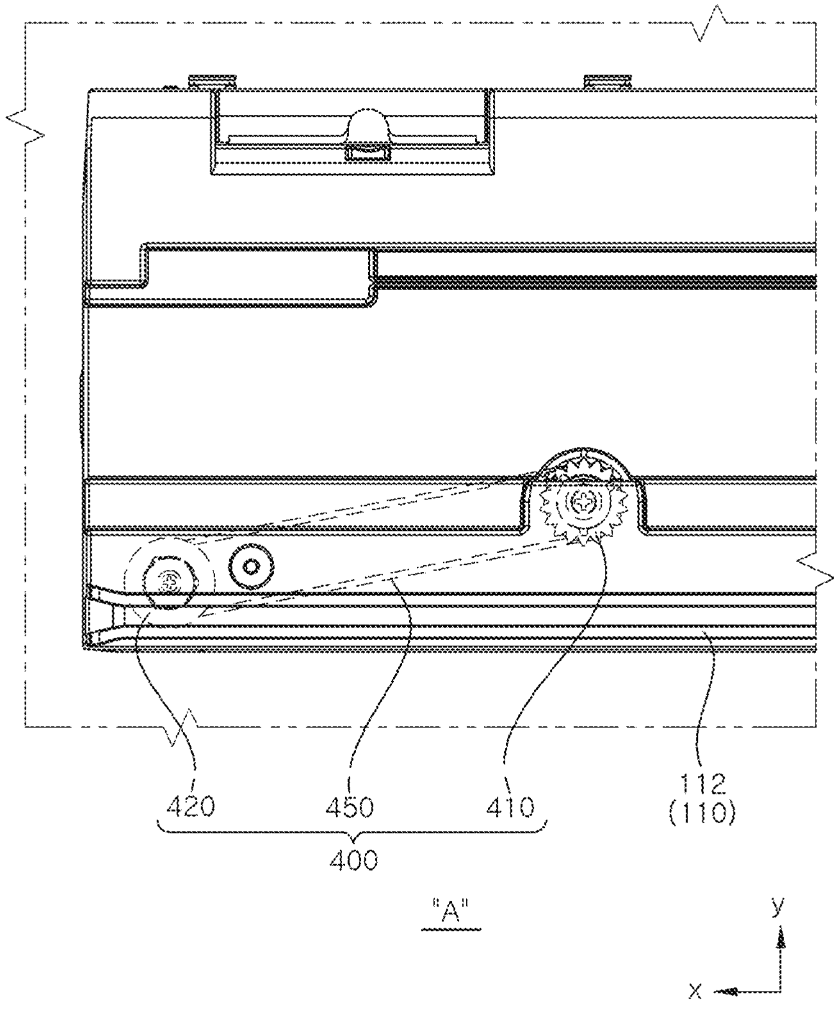
FIG. 3 is an enlarged side view of part "A" of FIG. 2.
Figure 4:
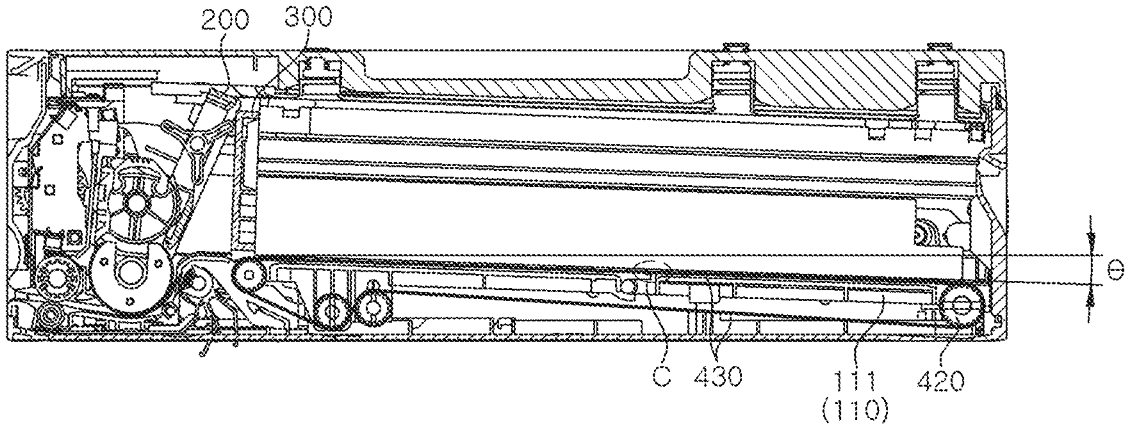
FIG. 4 is a cross-sectional side view taken along line "IV-IV'" of FIG. 2.
Figure 5:
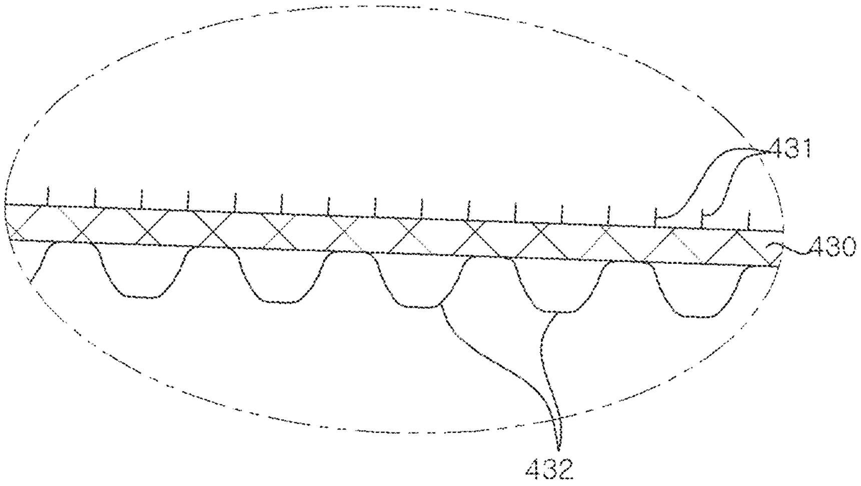
FIG. 5 is an enlarged cross-sectional side view of part "C" of FIG. 4.

Referring to FIG. 1, an automated teller machine 1 according to the present disclosure can stably stack mediums in a cassette 60 when the cassette 60 is arranged in a horizontal direction (x-direction). The automated teller machine 1 may include a main body 10, a deposit and withdrawal unit 20, a discrimination unit 30, a temporary holding unit 40, a conveyance path 50, and a cassette 60.

The main body 10 may include a frame/housing that provides the overall appearance of the automated teller machine 1. The main body 10 may be divided into an upper body 11 and a lower body 12. The deposit and withdrawal unit 20, the discrimination unit 30, and the temporary holding unit 40 may be arranged in the upper main body 11. The lower body 12 may be a safe that provides a space in which mediums can be stored. The cassette 60 may be arranged horizontally in the lower body 12.

The cassette 60 can be detachably arranged in the main body 10. When the cassette 60 is inserted and mounted inside the main body 10, the main body 10 can guide the cassette 60 in a horizontal direction. To this end, the main body 10 may be formed with a module guide that guides the movement of the cassette 60 in the horizontal direction. When the module guide guides the movement of the cassette 60 in the main body 10, the module guide may push a locking device 500 of the cassette 60, which will be described later.

The deposit and withdrawal unit 20 may provide a space for depositing and withdrawing mediums. The deposit and withdrawal unit 20 may be placed in the upper body 11. The deposit and withdrawal unit 20 can be connected to the discrimination unit 30, the temporary holding unit 40, and the cassette 60 through the conveyance path 50. When medium is inserted (deposited) into the deposit and withdrawal unit 20, the deposit and withdrawal unit 20 can transfer the deposited medium to the discrimination unit 30 through the conveyance path 50. When medium is dispensed (withdrawn) through the deposit and withdrawal unit 20, the deposit and withdrawal unit 20 can receive the medium to be dispensed from the cassette 60 through the conveyance path 50.

The discrimination unit 30 may recognize the medium as either a normal note or a rejected note by identifying the presence or absence of an abnormality in the medium moving along the conveyance path 50. The normal note may be a medium to be normally deposited into the automated teller machine 1. The rejected note is an abnormal note, and may be a damaged or counterfeit banknote or a paper that is not a banknote. For example, the rejected note may be a torn banknote, a counterfeit banknote, or a receipt, and the rejected note may be a normal note that has been damaged while moving along the conveyance path 50.

The temporary holding unit 40 can be used for the purpose of temporarily storing medium. The temporary holding unit 40 may be disposed in the upper body 11. The temporary holding unit 40 may be connected to the deposit and withdrawal unit 20 through the conveyance path 50. The normal or rejected notes discriminated by the discrimination unit 30 may be temporarily stored in the temporary holding unit 40. The temporary holding unit 40 may be configured in a drum-like structure.

The conveyance path 50 can transfer mediums between the deposit and withdrawal unit 20, the discrimination unit 30, the temporary holding unit 40, and the cassette 60. The conveyance path 50 may include a driving roller, a driven roller, and a switching gate for transferring the mediums. The conveyance path 50 may be driven by a motor and controlled by a controller.

Referring to FIGS. 2 to 5, the cassette 60 can store mediums recognized as normal notes by the discrimination unit 30. The mediums stored in the cassette 60 can be dispensed through the deposit and withdrawal unit 20 when there is a request for recovery or withdrawal from a customer. For example, the cassette 60 may be a recycle cassette (RC) module. A plurality of cassettes 60 may be provided in multiple pieces that are detachably arranged in the horizontal direction within the main body 10. The plurality of cassettes 60 may be arranged to be stacked in an upper and lower direction of the main body. The multiple cassettes 60 may store mediums by separating them by note type. The cassette 60 according to one embodiment of the present disclosure may include a case 100, a front plate 200, a push plate 300, and a moving assembly 400.

The case 100 may provide an accommodation space 101 in which mediums can be stored. The front plate 200, a push plate 300, and the moving assembly 400 may be disposed in the storage space 101. The case 100 may include a lower case 110 and an upper case 120.

The lower case 110 may form the storage space 101. The lower case 110 may be comprised of a support plate 111 that provides a bottom surface of the accommodation space 101 and a side plate 112 that provides a side surface of the accommodation space 101. The push plate 300 may be arranged to be horizontally movable through the moving assembly 400 on the support plate 111. The support plate 111 may be arranged to be inclined downward within the accommodation space 101 toward a stacking direction (x-direction) in which mediums are stacked. In other words, the support plate 111 may be arranged to be inclined downward toward the stacking direction (x-direction) at a predetermined rotation angle with respect to an arbitrary horizontal plane. When mediums are stacked within a stack space, if the medium is stacked in a downwardly inclined manner in the stack space by the support plate 111, the medium can be prevented from being stacked in a bulged or crumpled state in the stack space due to the self-weight of the medium.

The upper case 120 can open and close the accommodation space 101. An edge of the upper case 120 may be hingedly connected to an upper edge of the lower case 110 about a hinge axis. The upper case 120 can open and close the accommodation space 101 by rotating about the hinge axis. The upper case 120 may be provided with a handle that can be gripped by a user.

The front plate 200 may guide medium received through the conveyance path 50 to be stacked in the accommodation space 101 of the case 100. The front plate 200 may provide the stack space for stacking medium in a space between the front plate 200 and the push plate 300. The front plate 200 may be rotatably disposed in the case 100. For example, one end of the front plate 200 may be rotatably connected to the main body 10 through a front rotation axis.

The push plate 300 can guide the medium received through the conveyance path 50 together with the front plate 200 to be stacked in the accommodation space 101 of the case 100. The push plate 300 may provide the stack space for the medium stack in the space between itself and the front plate 200. The push plate 300 may be disposed to be horizontally movable in the accommodation space 101 toward or away from the front plate 200.

The moving assembly 400 can move the push plate 300 horizontally within the case 100. When the cassette 60 is mounted horizontally in the main body 10, the moving assembly 400 can receive driving force from the main body 10 and transmit it to the push plate 300. The moving assembly 400 may include a main moving gear 410, a moving shaft 420, and a moving belt 430.

The main moving gear 410 may be an intermediate gear that can receive driving force from the main body 10. When the cassette 60 is mounted on the main body 10, the main moving gear 410 can receive driving force from a driving gear disposed in the main body 10 by engaging with the driving gear in the main body 10. The main moving gear 410 may be disposed on a side portion of the case 100.

The moving shaft 420 can receive driving force from the main moving gear 410 and transmit it to the moving belt 430 and the moving shaft 420. The moving shaft 420 may be disposed at an end portion of the support plate 111 to extend in a width direction (z-direction) of the case 110. A part of the moving shaft 420 may be drivingly connected to the main moving gear 410. For example, an end of the moving shaft 420 may be drivingly connected to the main moving gear 410 through a power transmission belt 450. In addition, the moving shaft 420 may be drivingly connected to the moving belt 430. The moving shaft 420 can provide driving force to the push plate 300 through the moving belt 430.

The moving belt 430 can receive driving force from the moving shaft 420 and move the push plate 300 in the horizontal direction. The moving belt 430 may be disposed to surround the support plate 111 of the case 100 in a loop shape. The push plate 300 may be fixed to at least a portion of the moving belt 430. When the moving belt 430 receives driving force from the moving shaft 420, the push plate 300 can move in the horizontal direction (x-direction) on the support plate 111.

A support projection 431 and a gear projection 432 may be formed on the moving belt 430. The support projection 431 may support the bottom of the medium when the medium is stacked in the stack space. The support projection 431 may protrude on an upper surface of the moving belt 430. The support projection 431 may be provided in multiple pieces spaced apart in a longitudinal direction of the moving belt 430. The gear projection 432 may engage with the shaft gear of the moving shaft 420. When driving force is transmitted from the moving shaft 420, the gear projection 432 can move the moving belt 430 through engagement with the shaft gear.

Figure 6:
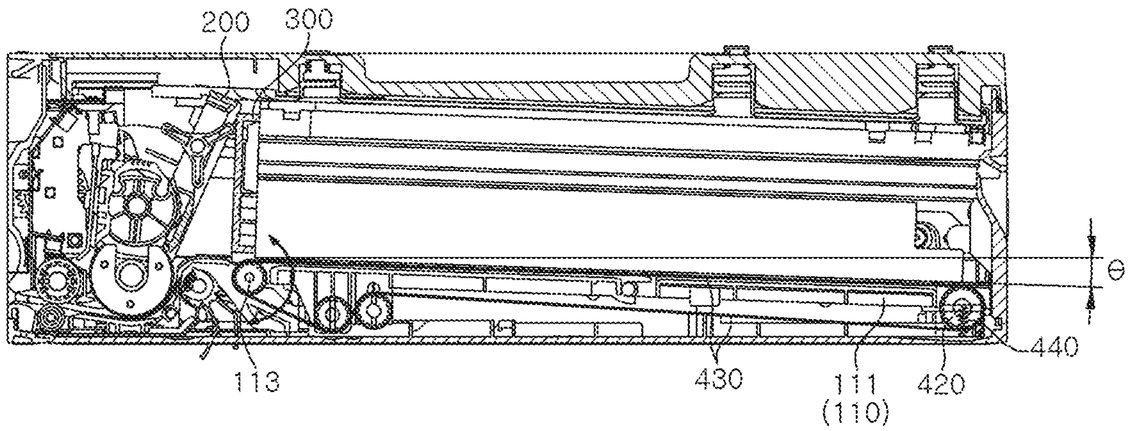
FIG. 6 is a cross-sectional side view showing a cassette according to another embodiment of the present disclosure.

Referring to FIG. 6, according to another embodiment of the present disclosure, the support plate 111 may be rotatably disposed in the case 100 through a rotation shaft 113. When a medium is stacked on the support plate 111, the support plate 111 can be rotated downward by the weight of the medium.

The support plate 111 receives elastic force from the elastic member, so that the rotation angle θ of the support plate 111 can vary depending on the weight of the medium. For example, the rotation angle θ of the support plate 111 may increase as the weight of the medium increases, and may decrease as the weight of the medium decreases. The support plate 111 may be returned to its original position by an elastic member 440 when the medium is removed from the stack space. The elastic member 440 may elastically connect the support plate 111 and the case 100.

Figure 7:
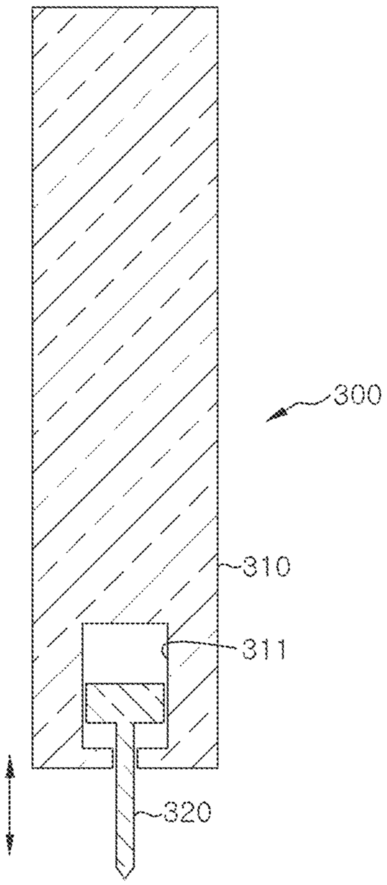
FIG. 7 is a cross-sectional view showing a push plate of the cassette according to another embodiment of the present disclosure.

Referring to FIG. 7, according to another embodiment of the present disclosure, the push plate 300 can block a gap space between a lower end of the push plate 300 and an upper surface of the support plate 111. The push plate 300 may include a plate body part 310 and a plate rib part 320.

The plate body part 310 may be disposed to be horizontally movable in the accommodation space 101 toward or away from the front plate 200. The plate body part 310 may be fixed to the moving belt 430 of the moving assembly 400. A plate groove 311 may be formed in a lower portion of the plate body part 310. The plate groove 311 may provide a receiving space for the plate rib part 320 to be inserted in and protruded from.

The plate rib part 320 may be disposed in the plate groove 311 to be inserted in and protruded from the plate body part 310 downwardly. The plate rib part 320 may be protruded from the plate groove 311 of the plate body part 310 by its own weight when the push plate moves in the stacking direction (x-direction). When the plate rib part 320 is protruded from the plate body part 310, the gap space between the lower end of the plate body part 310 and the upper surface of the support plate 111 can be blocked.

As described above, according to the present disclosure, when the medium is stacked horizontally, the medium is stacked in a downwardly inclined manner within the stack space, so that the medium can be prevented from being stacked in a bulged or crumpled state, and ultimately, the medium can be stably stacked within the cassette.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A cassette for an automated teller machine, comprising:
- a case providing a support plate for supporting a medium;
- a front plate rotatably disposed in the case to guide the medium into an accommodation space within the case;
- a push plate disposed on the support plate to be movable horizontally toward or away from the front plate; and
- an elastic member that provides elastic force to the support plate to restore the support plate to its original position when the support plate is rotated downwardly,
- wherein the support plate is disposed to be inclined downward within the accommodation space in a stack direction in which the medium is stacked.

2. The cassette of claim 1, further comprising a moving assembly for horizontally moving the push plate,
- wherein the moving assembly includes:
- a main moving gear disposed on a side portion of the case to be engaged with a driving gear disposed in the automated teller machine when the cassette is mounted in the automated teller machine;
- a moving shaft drivingly connected to the main moving gear to receive driving force from the main moving gear; and
- a moving belt configured to receive driving force from the moving shaft and horizontally move the push plate.

3. The cassette of claim 1, wherein the push plate includes:

a plate body part having a plate groove formed in a lower portion thereof; and a plate rib part disposed in the plate groove to be inserted in and protruded from the plate body part downwardly.

4. The cassette of claim 3, wherein the plate rib part is protruded from the plate body part when the push plate moves on the support plate in the stack direction while the support plate is rotated downward to block a gap space between a lower end of the plate body part and an upper surface of the support plate.

5. A cassette for an automated teller machine, comprising:

a case providing a support plate for supporting a medium;

a front plate rotatably disposed in the case to guide the medium into an accommodation space within the case;

a push plate disposed on the support plate to be movable horizontally toward or away from the front plate; and a moving assembly for horizontally moving the push plate, wherein the support plate is disposed to be inclined downward within the accommodation space in a stack direction in which the medium is stacked, wherein the moving assembly includes:

a main moving gear disposed on a side portion of the case to be engaged with a driving gear disposed in the automated teller machine when the cassette is mounted in the automated teller machine;

a moving shaft drivingly connected to the main moving gear to receive driving force from the main moving gear; and a moving belt configured to receive driving force from the moving shaft and horizontally move the push plate, wherein the moving belt has a support projection formed on an upper surface thereof to support the medium, and a gear projection formed on a bottom surface thereof to engage with a shaft gear of the moving shaft.

6. A cassette for an automated teller machine, comprising:

a case providing a support plate for supporting a medium;

a front plate rotatably disposed in the case to guide the medium into an accommodation space within the case; and a push plate disposed on the support plate to be movable horizontally toward or away from the front plate, wherein the support plate is disposed to be inclined downward within the accommodation space in a stack direction in which the medium is stacked, wherein the support plate is rotatably disposed in the case so that a downward tilting rotation angle is variable depending on a weight of the medium.

* * * * *